3,072,524
OZONIDES IN ALCOHOL AS DISINFECTING SOLUTIONS
Nikolaus Gäbelein, Munich, Germany, assignor to Nikolaus Gäbelein, Munich, Germany and Edith Oettinger, Frankfurt am Main, Germany
No Drawing. Filed Feb. 2, 1959, Ser. No. 790,319
Claims priority, application Switzerland Feb. 7, 1958
6 Claims. (Cl. 167—22)

The invention relates to a new class of disinfectants and deodorizers and to a process for its production.

Nowadays, coarse and fine disinfectants are no longer produced from vegetable raw materials but are composed, practically without exception, of more or less toxic non-physiological chemicals which are better able to ensure the sterility which it is sought to attain, than the vegetable raw materials of the old days. If the hygenic value of the presently commercially available products are tested, it will certainly be found that most of them are sufficiently effective for most pathogenic agents and fungi, but almost all of them are ineffective against *Mycobacterium tuberculosis*. The few which do actually destroy the tubercular bacteria only do so after a relatively long period of action whereby, when the human skin is to be disinfected, injury to the skin is in most cases unavoidable.

Thus, a mixture of 70% alcohol and 30% water applied for 10 minutes has hitherto been recognized as the best disinfecting agent against *Mycobacterium tuberculosis* but this period of treatment is undesirably long for practical use as, on the one hand, it injures the skin if employed frequently and, on the other hand, it does not destroy several other spore-forming germs.

It has also been known for a long time to use organic ozonides for disinfecting purposes. For example, according to the German Patents 126,292, 125,898 and 452,227, soaps, benzene and thymol/furfural in aqueous solutions are ozonized until they become water-soluble. These preparations are, however, of little practical value because the active oxygen contained therein cannot be retained for long. On the other hand, however, the olive-oil ozonide free from water and solvents, which has been proposed by Cronheim (J. Am. Pharm. Assoc. Sci. Ed. 36, 274–8 (1947)) for the treatment of wounds, is more stable. Its effectiveness is explained by the fact that such ozonides in contact with serum water produce active oxygen which then develops antibacterial or bactericidal properties.

It is also known that traces of many organic peroxides and ozonides occur in nature, for example in ethereal oils and terpenes.

Taking into consideration this known state of the art, the object of the invention is to provide a new process which destroys *Mycobacterium tuberculosis* in a few minutes or seconds, forms a greasy film on the skin and also kills other germs, but which at the same time leaves behind only those substances which, providing suitable raw materials are chosen, can be reabsorbed by the skin in the form of "physiologic components," so that no toxic harm whatever can be caused.

This object is attained by the process according to the invention which comprises the steps of dissolving peroxidic compounds of organic alcohols, aldehydes, ethers, ketones and acids in short-chain aliphatic alcohols, whereby esters and acetals may eventually be formed with the solvent. Quite unexpectedly, these alcoholic solutions possess the advantage over aqueous solutions, that the loss of their active oxygen content, even after 8 months' storage, is very slight, namely in the order of about 5 to 10% only, whereas in aqueous solution they decompose much more rapidly into fatty acids.

In carrying out the process according to the invention in the most advantageous manner, unsaturated organic compounds, particularly unsaturated aliphatic chain compounds, are converted into their ozonides in a known manner, and shortly after or during the ozonization reaction the forming or formed ozonides are dissolved in short-chain aliphatic alcohols which may also contain a limited amount of water, so that the ozonides are converted into peroxy-bodies by hydrolysis or alcoholysis. It is immaterial that in so doing, the production of the peroxy-compounds must always be achieved via the corresponding ozonides.

Ozonides can be considered a special type of the larger class of organic peroxides. If the ether bridges in ozonide molecules are split, oxy-peroxides are obtained. This method was first described by Rieche in the inverse sense, who produced ozonides from oxy-peroxides by elimination of water ("Zeitschrift für angewandte Chemie," March 1958). It is evident that the ozonides prepared in this manner can be similarly converted into disinfectants by dissolving in alcohol. On the other hand, however, it is also possible to obtain a very strong disinfecting effect with ordinary peroxides, that is without oxy-groups, by dissolving them in alcohols.

Methanol, ethanol, propanol and butanol have thus far been employed successfully by me as alcohols in the process according to the invention, but higher liquid alcohols as well as cycli alcohols such as cyclo-hexanols should also be suitable therefor.

Solutions which had been stored for some time at room temperature as well as those which were only a few days old, showed, when subjected to bacteriologic tests, that they destroy tubercular bacteria in culture experiments within 10 seconds. Preferred test solutions contained 5% ozonide in 70% ethanol. A guinea-pig test showed, after six months' observation, that Tbc sputum on linen rags was sterile in 1 to 2 minutes. The pus-forming germs were also quickly destroyed.

A number of tests carried out by me to ascertain the bactericidal properties of the above-mentioned pure ozonides of linoleic acids which as is known have already been used, showed that they have no effect on *Mycobacterium tuberculosis*, at least, if applied for satisfactorily short periods of time. However, they become effective immediately when alcohol is used as solvent in accordance with my invention. This surprising effect is believed to be due to a conversion of unsaturated fatty acids which constitute about 30% of the bacteria fat by reaction with the organic peroxy-compounds in small quantities into epoxides and finally into di-hydroxy- or polyhydroxy-fatty acids with the result that the fat covering the bacteria becomes much more permeable for the solvent in the disinfectant according to the invention. It follows, therefore, that viscous ozonides do not penetrate the fat coating of the tubercular bacteria nearly as quickly as the alcoholic solutions of their hydrolyzation or alcoholyzation products.

The invention will be further illustrated by a number of examples given hereinafter which are, however, not to be considered limitative of the scope of the invention in any way or form.

EXAMPLE I

Linoleic acid ethylester is continuously dripped slowly from above into an absorption tower charged with porcelain absorption rings. Air containing about 2% by volume of ozone is blown into the tower from below in counter-current flow to the fatty acid. With a tower having 15 cm. in diameter and 70 cm. in height, 100 g. of ester can be completely converted into the corresponding ozonide in about 24 hours. The ozonide is of relatively lighter color and more viscous than the starting ester.

100 g. of the resulting linoleic acid-ethylester-ozonide are dissolved in one liter of commercial ethanol (90% by volume of $C_2H_5OH$ and a trace of $CH_3OH$), and then allowed to stand for three days at room temperature, whereby presumably different alcoholytic cleavages of the ozonide compounds can take place. The total effect can, however, be proved by the fact that the reaction between the ozonide and a glacial acetic acid-calcium iodide solution which, as is known, takes place under separation of iodine and requires several hours for a quantitatively complete reaction, now progresses much more quickly and requires practically only about half the reaction time. The peroxides now present in the ethanolic solution are no longer a homogeneous compound but contain different fractions of the fatty acid molecule as can be proved by fractionated distillation under vacuum. These fractions include light volatile components containing about 10% of the peroxidically bound oxygen and less volatile components containing about 10% of the peroxidically bound oxygen.

The solution obtained after standing for three days, which now contains only a small quantity of ozonides and mainly only peroxide, constitutes a disinfectant ready for use. Its effectiveness can, however, be considerably increased if it is further diluted with at least 30% by weight of water. Stronger dilution with water can be carried out up to 70% (by weight) water content but then the use of an intermediary solvent is required.

EXAMPLE II

One gram (g.) cyclohexene is dissolved in 10 ccs. ethanol and ozonized at temperatures below 0° C., for instance —3° C. After carefully distilling off the alcohol under vacuum, the pure ozonide is obtained. After standing for several days at room temperature, alcoholytic cleavage of the ozone bridge bond sets in and a considerable number of different peroxides can be assumed as being formed a result of this cleavage and moreover, in consequence of reactions with the solvent alcohol. It has not yet been possible to isolate these different components and to determine their constitution. However, in order to determine the disinfectant effectiveness of the composite product according to the invention, bacteriological tests were applied which confirm that a high degree of effectiveness against the previously mentioned bacteria is only obtained by means of the above described cleavage step.

EXAMPLE III

One gram of linoleic acid-ethylester is ozonized at temperatures below +10° C., for instance at +5° C. without use of a solvent. When 70% of the theoretical ozone consumption has taken place the ozonide formed is dissolved in a mixed solvent of 30% water and 70% alcohol. The disinfectant can then be placed on the market as a 5% (by weight) solution or a 20% (by weight) concentrate.

EXAMPLE IV 5 grams of linoleic acid-ethylester-ozonides obtained as described in Example I are dissolved in 50 ccs. of pure ethanol and mixed with 35 ccs. of water to which 10% by weight of an emulsifier (fatty acid glucosides) had been added. A clear transparent solution forms. Without the emulsifier the solution would separate in two phases.

"Tween-80" is used, for example, as the emulsifier. The group of "Tween" emulsifiers must be considered as fatty acid glucosides. There are different types on the market but all of them can be used in the same manner for the process according to the invention.

EXAMPLE V 30 grams of oleyl alcohol are dissolved in 600 milliliters (ml.) of methanol and treated at temperatures below 0° C., for instance at —10° C., with ozoniferous oxygen until the bromium test for double compounds is negative. After standing for three days, the resulting ozonideic product is converted by the methanol solvent into the composite product showing the maximum of disinfecting properties. the solution can then be diluted to a water content of 30 to 40% by weight by the addition of water. Yield: 800 ml. of a disinfectant solution with 32 g. ozonide content (which has been converted into peroxides by the dissolving process).

EXAMPLE VI 2 g. of citral (a mixture of geranial and nerol in a molar ratio of 1:1 having a boiling point of 228° C.) are spread out in a thin layer on a shallow dish (10 x 10 cm.) and converted into their ozonide by 2% ozone-air passed over the aldehyde at a temperature below 0° C., for instance —8° C., whereby the volatile citral is prevented from escaping in the form of vapors and causing losses of yield. The resulting 2.2 g. of a viscous citral-ozonide mass are taken up in 50 ccs. aqueous ethanol (90% by volume of $C_2H_5OH$ and a trace of $CH_3OH$) and, after being allowed to stand for several days, the solution is admixed with 15 ml. of water. The solution is a disinfectant ready for use.

EXAMPLE VII 2 g. of alpha-ionone are ozonized in a shallow dish as in Example VI. In this case, the fininshed disinfectant is prepared by dissolving the resulting ozonide in 50 ml. ethanol and by the addition of 15 ml. water.

EXAMPLE VIII

Oleic acid is ozonized in the same manner as linoleic acid-ethylester described in Example I, without use of a solvent and in a counter-current flow of ozoniferous air. The acid is concurrently and continuously distributed over adsorbent layers of inert material such as porcelain or glass having large surface areas, and is brought into contact with the ozone-charged air, in a known manner, according to the principle of counter-current flow. The termination of the ozonization can be determined by the bromium test for double bonds.

5 g. of the resulting oleic acid-ozonide are dissolved in 80 ml. of propanol and, after standing for several days at room temperature, admixed with 15 ml. water.

The solution is then ready for use as disinfectant.

EXAMPLE IX

Butyl peroxide, produced by the process described in the German Patent 857,810, is dissolved in a mixture of 10 ml. of butanol, 30 ml. of ethanol and 60 ml. of water in such amounts that the resulting solution contains 5% by weight of butyl peroxide. A characteristic of the solution is that it contains an appreciable quantity of the disinfectant even when converted to the gaseous phase.

EXAMPLE X 6.8 g. of perboron acetate, 25 ml. of xylene and 8.0 g. of propionic acid are heated in a known manner for half an hour in a quartz flask, whereupon the separated acetic acid is distilled off under vacuum and the resulting pure perpropionic acid is recovered by fractionation.

It represents an effective disinfectant in a 5%-solution in propanol diluted with 20% by weight of water.

The results of a number of bacteriological tests are given below which were carried out with linoleic acid-ethylester-ozonides, produced by the process according to the invention, and dissolved in ethanol as described in Example I.

Thereby peroxides according to the invention were formed, which are, however, summarily referred to as "ozonide in alcohol" in the following description of the test results.

Definitions of the signs used in the following test results are given below:

++++ full growth
+++ reduced growth
++ half growth
+ slight growth
φ no growth

Phenol 1:100 means an aqueous solution of 1 volume part of phenol in 99 parts of water.

TEST I

*Mycobacterium Tuberculosis*

Tb suspension test
Stock PAMESKU 2 mg. culture material, check ++++
A. 70% methanol: destroyed in 13 minutes.

| B. Ozonide in Alcohol | 1% | 2% | 4% | 8% |
|---|---|---|---|---|
| In 1 minute | ++ | + | φ | φ |
| In 2 minutes | + | φ | φ | φ |
| In 5 minutes | φ | φ | φ | φ |

TEST II

*Micrococcus Pyogenes* var. *Aureus*

Methanol after 10 minutes still no sterility.
A. Phenol 1:100, no sterility after 7½ minutes, sterility after 10 minutes.

| B. Ozonide in Alcohol | 1/1000 | 1/2000 | 1/4000 | 1/8000 |
|---|---|---|---|---|
| In 2.5 minutes | φ | + | + | + |
| In 5 minutes | φ | φ | + | + |
| In 7.5 minutes | φ | φ | + | + |
| In 10 minutes | φ | φ | φ | + |

TEST III

*Bacterium Coli*

Methanol alone, no sterility after 10 minutes.
A. Phenol 1:100, no sterility after 2.5 and after 5 minutes, sterility after 7.5 and after 10 minutes.

| B. Ozonide in Alcohol | 1/1000 | 1/2000 | 1/4000 | 1/8000 |
|---|---|---|---|---|
| In 2.5 minutes | + | + | + | + |
| In 5 minutes | + | + | + | + |
| In 7.5 minutes | φ | + | + | + |
| In 10 minutes | φ | + | + | + |

TEST IV

*Bacterium Pyocyaneus*

A. Methanol, no sterility after 10 minutes.
B. Phenol 1:100, no sterility after 2.5 and after 5 minutes, sterility after 7.5 and after 10 minutes.

| C. Ozonide in Alcohol | 1/100 | 1/200 | 1/400 | 1/800 | 1/1600 |
|---|---|---|---|---|---|
| In 2.5 minutes | φ | + | + | + | + |
| In 5 minutes | φ | φ | φ | + | + |
| In 7.5 minutes | φ | φ | φ | φ | + |
| In 10 minutes | φ | φ | φ | φ | φ |

TEST V

*Candida Albicans*

A. Methanol, no sterility after 10 minutes.
B. Phenol 1:100, sterility after 10 minutes.

| C. Ozonide in Alcohol | 1/100 | 1/200 | 1/400 | 1/800 | 1/1600 |
|---|---|---|---|---|---|
| In 2.5 minutes | φ | φ | + | + | + |
| In 5 minutes | φ | φ | φ | φ | + |
| In 7.5 minutes | φ | φ | φ | φ | + |
| In 10 minutes | φ | φ | φ | φ | φ |

TEST VI

*Hand Disinfection According to Schumburg Method*

Test germ: *Coli*.

The 2.5% ozonide solution in alcohol is suitable for hand disinfection if allowed to act for four minutes.

It will be understood that this invention is susceptible to further modification and, accordingly, it is desired to comprehend such modification within this invention as may fall within the scope of the appended claims.

What I claim is:

1. A process for preparing practically stable compositions with bactericidal, disinfecting and deodorizing action, which process comprises completely ozonizing in the absence of an alcohol an unsaturated compound of the general formula $$R_1—X$$

wherein $R_1$ is a radical of the group consisting of linoleyl and oleyl; and X is a radical of the group consisting of —COOH, —COO alkyl, —CHO and —CH$_2$OH; dissolving the obtained ozonization product immediately in an alcohol of the general formula $$R_2—OH$$

wherein $R_2$ is a radical of the group consisting of methyl, ethyl, propyl and butyl; and allowing the solution obtained to stand at room temperature until the reaction between the ozonide and the alcohol is essentially finished.

2. The process of claim 1, further comprising the step of diluting the final product of the process of said claim with water with the provision that an emulsifier is used if the water amounts to more than 30% by weight of the alcohol present.

3. A process for preparing practically stable compositions with bactericidal, disinfecting and deodorizing action, which process comprises completely ozonizing an unsaturated compound of the general formula $$R_1—X$$

wherein $R_1$ is a radical of the group consisting of linoleyl and oleyl; and X is a radical of the group consisting of —COOH, —COO alkyl, —CHO and —CH$_2$OH, in the presence of an alcohol of the general formula $$R_2—OH$$

wherein $R_2$ is a radical of the group consisting of methyl, ethyl, propyl and butyl; and allowing the solution obtained to stand at room temperature until the reaction between the ozonide and the alcohol is essentially finished.

4. The process of claim 3, further comprising the step of diluting the final product of the process of said claim with water with the provision that an emulsifier is used if the water amounts to more than 30% by weight of the alcohol present.

5. Practically stable compositions with bactericidal, disinfecting and deodorizing action, containing an alcohol of the general formula $$R_2—OH$$

wherein $R_2$ is a radical of the group consisting of methyl, ethyl, propyl and butyl; and dissolved therein the reaction product between the said alcohol and an ozonide of an unsaturated compound of the general formula $$R_1-X$$

wherein $R_1$ is a radical of the group consisting of linoleyl and oleyl; and X is a radical of the group consisting of —COOH, —COO alkyl, —CHO and —CH$_2$OH, said reaction product containing the atomic grouping

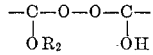

in the place of the carbon-carbon double bond of the unsaturated compound.

6. The compositions of claim 5, further containing water with the provision that an emulsifier is used if the water amounts to more than 30% by weight of the alcohol present.

References Cited in the file of this patent

UNITED STATES PATENTS

| 2,430,450 | Brown et al. | Nov. 11, 1947 |
| 2,715,611 | Weeks | Aug. 16, 1955 |

OTHER REFERENCES

Karrer et al.: Organic Chemistry, Elsevier Publ. Co., Inc., N.Y. (1946), pp. 53–54. (Copy in POSL.)

Reiche: Chemical Abstracts, vol. 26 (1932), pp. 81–82. (Copy in POSL.)

Modern Drug Encyclopedia, 6th Ed., Drug Publications, Inc., N.Y. (1955), p. 733. (Copy in POSL.)

Cronheim: Chem. Abst., vol. 42 (1948), p. 1022. (Copy in POSL.)

Cronheim: J.A.P.A., Sci. Ed., vol. 36, 1947, pp. 274–278.

Cronheim: J.A.P.A., Sci. Ed., vol. 36, 1947, pp. 278–281.